United States Patent [19]

Mott

[11] 4,304,137

[45] Dec. 8, 1981

[54] AIR DIRECTION INSENSITIVE STATIC PRESSURE SENSOR

[75] Inventor: Richard C. Mott, Harwood Heights, Ill.

[73] Assignee: Honeywell Inc., Minneapolis, Minn.

[21] Appl. No.: 43,937

[22] Filed: May 31, 1979

[51] Int. Cl.³ .............................................. G01F 1/46
[52] U.S. Cl. .................................... 73/861.65; 73/182; 73/189
[58] Field of Search ................. 73/212, 182, 701, 716, 73/189, 861.65, 861.66, 861.67, 861.68

[56] References Cited

U.S. PATENT DOCUMENTS

| | | | |
|---|---|---|---|
| 2,554,634 | 5/1951 | Paine et al. | 73/212 |
| 2,662,402 | 12/1953 | Ince, Jr. et al. | 73/212 |
| 2,714,819 | 8/1955 | Clark | 73/212 |
| 2,809,520 | 10/1957 | Richard, Jr. | 73/189 |
| 2,970,476 | 2/1961 | Cary | 73/701 |
| 3,347,095 | 10/1967 | Strong et al. | 73/212 |
| 3,511,098 | 5/1970 | Reichert | 73/212 |
| 3,625,063 | 3/1970 | Urbanosky | 73/716 |
| 3,685,355 | 8/1972 | De Baun | 73/212 |
| 3,981,193 | 9/1976 | Goulet | 73/212 |
| 4,052,897 | 10/1977 | De Baun | 73/212 |
| 4,137,781 | 2/1979 | Andrus | 73/189 |

Primary Examiner—Donald O. Woodiel
Attorney, Agent, or Firm—Trevor B. Joike

[57] ABSTRACT

A static pressure sensor for sensing the static pressure within a duct regardless of the direction of the air moving through the duct is disclosed having a tube for sensing static pressure, the tube providing an output pressure which is dependent upon the static pressure and a mechanism for permitting the alignment of the tube with respect to the direction of air moving through the duct so that the sensor is direction insensitive to that air.

17 Claims, 4 Drawing Figures

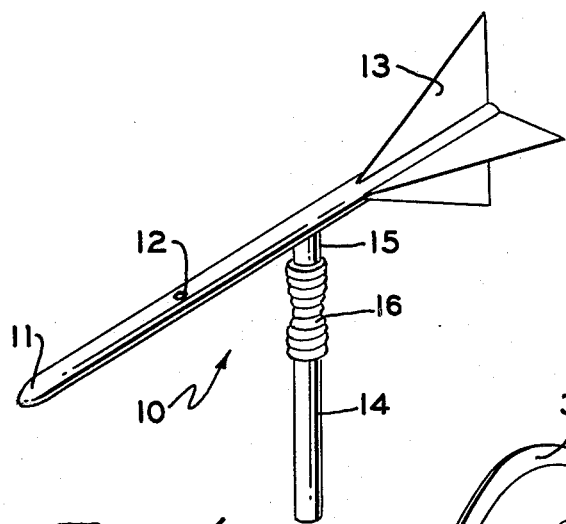
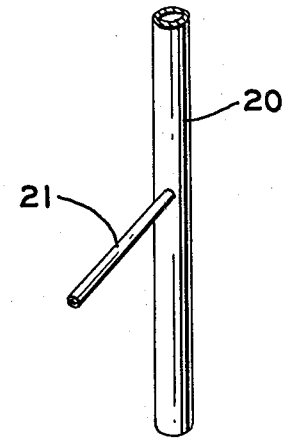
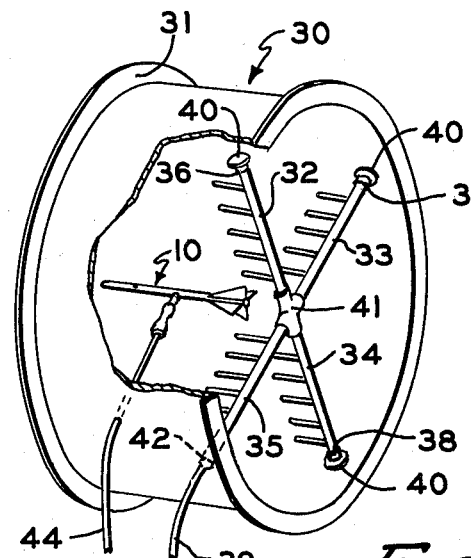
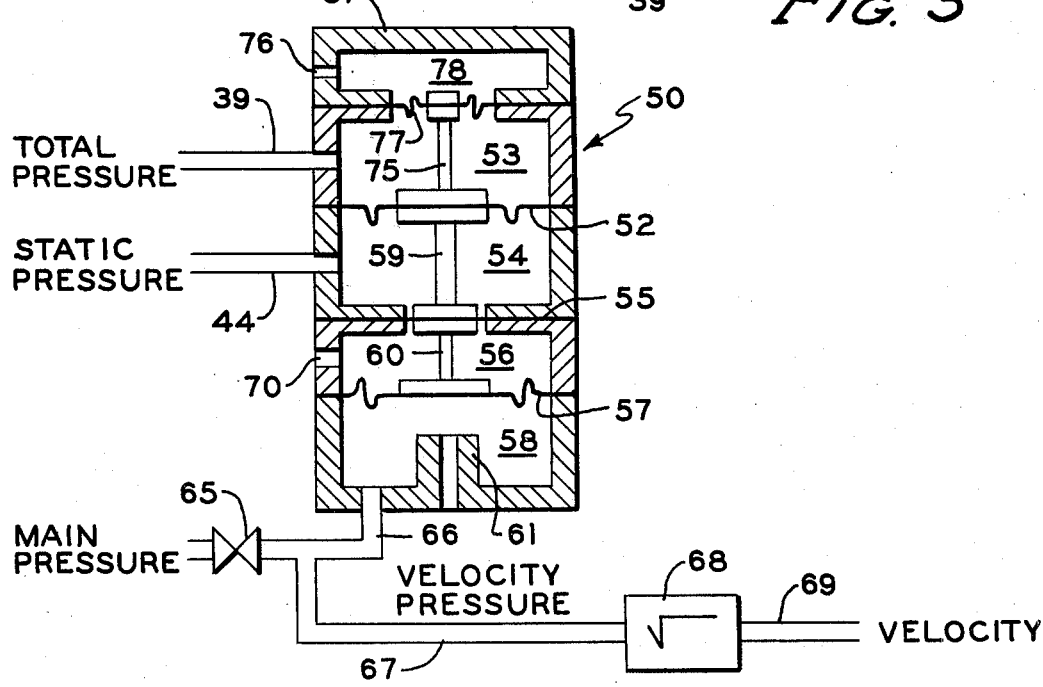

AIR DIRECTION INSENSITIVE STATIC PRESSURE SENSOR

BACKGROUND OF THE INVENTION

The present invention relates to flow stations for measuring the velocity of air moving through a duct and, in particular, to a static pressure sensor for use with such a flow station to measure the static pressure within a duct and which is not sensitive to the direction of air moving across the sensor.

Flow stations are devices that are inserted into ventilation air ducts within a building to measure the actual flow of air therethrough to some reasonable degree of accuracy. The impact of energy conservation and variable air volume systems has resulted in an increase in the use of these devices since they can be used to reduce energy consumption by insuring that only a sufficient amount of air is supplied to a zone to meet desired conditions.

The measurement of air flow in a duct system has always been difficult and somewhat unreliable. A number of devices have been available in the past and include velometers, anemometers, hot wire anemometers, pitot tubes, orifice plates, venturis, elbow meters, and flow nozzles. Some of these are localized velocity measuring devices and require multiple readings and an overall average to obtain an average duct velocity or flow. Others read an average flow rate but require individual calibration and require a severe pressure drop which represents lost energy and, therefore, inefficiency.

To solve these problems, the prior art introduced a multi-pitot tube self-averaging flow station. The rationale for this approach is that the pitot tube when properly designed is an inherently accurate sensor for measuring velocity pressure and does not require calibration. By introducing multi-pitot tubes located at equal duct area points and averaging the output of the pitot tubes, an accurate measure of average duct velocity and consequently average duct flow is obtained. The pressure drop in such a flow station is considerably less than a conventional orifice plate. The velocity pressures measured at the multiple points by the flow station is averaged by connecting each total pressure pick up into a first common manifold and each static pressure pick up into a second common manifold. The two manifolds then represent the average of the total and of the static pressures. Subtraction of these two pressures yields the average velocity pressure since the total pressure picked up by a pitot tube is a composite of velocity pressure and static pressure. Then, finally, in order to obtain velocity, or the amount of air moving through the duct, it is necessary to take the square root of the velocity pressure.

It can be shown that the velocity pressure, and as a result the total pressure, can vary substantially across the duct and, therefore, a plurality of total pressure pick up tubes is required for the average. However, the prior art has recognized that static pressure does not vary drastically across the duct and, therefore, only one static pressure pick up tube is required for an accurate measurement of the static pressure within the duct. Although more than one static pressure sensor may be required for larger ducts, as a general rule only one static pressure sensor is needed for a substantially accurate measurement of static pressure.

The prior art also found that air flowing through the duct is turbulent and, therefore, has a rotational component to it. It was found that both the total pressure pick up tubes and the static pressure pick up tubes were direction sensitive depending upon the direction of the air as it moved past the opening of the pick up tube. To eliminate this direction dependency, the prior art relied upon either a honeycomb of tubes for straightening the air or flow columnators at each pick up point. However, each approach adds material which restricts the size of the air duct thus creating undesired pressure drops. The purpose of the present invention is to eliminate this extra material in the duct thus reducing the pressure drop while yet retaining the direction insensitivity of the flow station. This objective can be accomplished by providing a static pressure pick up tube which is aligned so as to be insensitive to the direction of air moving passed it. In a more refined version of the invention, the static pressure sensor is self-aligning with air movement.

SUMMARY OF THE INVENTION

The static pressure sensor according to the instant invention includes a tube for sensing static pressure, an output connection from the tube for providing an output pressure dependent upon the static pressure sensed by the tube, and a means for aligning the tube so that it is insensitive to the direction of the air moving through the duct.

BRIEF DESCRIPTION OF THE DRAWINGS

These and other features and advantages will become more apparent from a detailed consideration of the invention when taken in conjunction with the drawings in which:

FIG. 1 is a drawing of a self-aligning static pressure sensor;

FIG. 2 is a diagram of a direction insensitive total pressure pick up tube;

FIG. 3 is a diagram of a flow station incorporating the concepts of FIGS. 1 and 2; and, FIG. 4 is a system diagram for deriving an output signal representative of velocity as a function of both total pressure and static pressure.

DETAILED DESCRIPTION

FIG. 1 shows the self-aligning static pressure sensor 10 which comprises hollow tube 11 having an outside circumference and an inside circumference. An aperture 12 extends from the outside circumference at the top of the tube through the tube to the inside circumference of the tube. Thus, the static pressure existing at aperture 12 is communicated from the outside of the tube to the hollow inside of the tube. At the end of tube 11 is tail 13 having a plurality of fins so that as air moves through the duct, tail 13 operates to insure that tube 11 is pointed parallel to the air flow. Thus, static pressure sensor 10 is insensitive to air direction and will provide a substantially uniform output as the direction of air flow within the duct changes even as the static pressure within the duct may remain unchanged. In order to communicate the static pressure to a controller, an output tube 14 is connected to tube 15 depending from tube 11 which tube 15 communicates with the interior or hollow of tube 11. Tubes 14 and 15 are connected together by any flexible joint such as plastic tubing 16. Output tube 14 will then supply the output pressure P0 to be used by a controller or indicating device.

In addition to the static pressure sensor shown in FIG. 1, a flow station requires a total pressure sensor. It can be shown that the total pressure sensor is also dependent upon the direction of air moving through the duct. However, the total pressure pick up sensor of FIG. 2 can be shown to be relatively insensitive to the direction of air moving through the duct. This total pressure sensor comprises a manifold 20 to which is connected a plurality of elongated tubes only one of which is shown at 21. Without tube 21, i.e. with simply a hole extending through manifold 20 to the interior thereof, the total pressure sensor is considerably more direction sensitive than with the elongated tube 21 attached as shown. It can also be shown that with the elongated tube 21 for total pressure pick up and with the self-aligning static pressure sensor shown in FIG. 1, the flow station will be substantially air direction insensitive.

FIG. 3 shows a flow station incorporating the concepts shown in FIGS. 1 and 2. The flow station 30, which is to be mounted as a section of the duct through which air is moving and in which the velocity of the air is to be sensed, comprises housing 31 in which is located the total pressure and static pressure sensors. The total pressure sensor is comprised of four tubes 32, 33, 34 and 35 three of which have end caps 36, 37 and 38 sealing one end thereof. One end of tube 35 is then connected by line 39 to supply an output pressure based upon the average total pressure sensed by the manifold tubes 32–35. Manifolds 32–35 may be mounted to housing 31 by suitable brackets 40. Manifold tubes 32–35 are hollow with the elongated tubes 21 pointed into the direction of air flow and connecting the total pressure of the air flow to the interior of their associated manifolds. Each tube 32–35 is connected to a common junction 41 so that the interior of all tubes are connected together. Thus, this manifold arrangement insures that the pressure at end 42 of tube 35 represents the average total pressure of the total pressures at the points sensed by elongated tubes 21.

Static pressure sensor 10 shown in FIG. 1 is shown mounted in the duct. The output tube 14 is mounted to housing 31 by any suitable mounting bracket and the interior of tube 14 and thus the interior of tube 11 is connected to output line 44. Thus, output line 39 supplies the average total pressure signal and output line 44 supplies the static pressure signal for the air moving through housing 31. Tail 13 of static pressure sensor 10 will insure that tube 11 aligns parallel to the flow of air moving through the duct and elongated tubes 21 connected to manifold tubes 32–35 will insure that the total pressure sensor will be substantially insensitive to the direction of air moving through the duct. The output signals in lines 39 and 44 can then be used to determine the velocity of air moving through the duct.

In FIG. 4, there is shown a system for determining velocity based upon total pressure and static pressure. This system includes diaphragm module unit 50 for subtracting static pressure from total pressure. This module 50 comprises housing 51 having diaphragm 52 separating chambers 53 and 54, diaphragm 55 separating chambers 54 and 56 and diaphragm 57 separating chambers 56 and 58. Diaphragms 52 and 55 are interconnected by pusher 59 and diaphragms 55 and 57 are connected together by pusher 60 so that all diaphragms move in unison. Within chamber 58 is nozzle 61 which cooperates with diaphragm 57 for controlling the pressure in chamber 58. Nozzle 61 connects chamber 58 to atmosphere. Diaphragm 77 separates chambers 53 and 78 with chamber 78 being connected to atmosphere through aperture 76. Pusher 75 interconnects diaphragms 77 and 52.

The output signal from the total pressure sensor is connected by line 39 to chamber 53 and the output signal from the static pressure sensor is connected by line 40 to chamber 54. These pressures oppose one another across diaphragm 52 so that the static pressure is subtracted from the total pressure to yield velocity pressure. This velocity pressure acts through pusher 59, diaphragm 55, pusher 60 and diaphragm 57 to control the position of diaphragm 57 so that, during quiescent conditions when the total pressure signal in line 39 and the static pressure signal in line 40 are not changing, the pressure within chamber 58 will balance the difference between the total pressure in chamber 53 and the static pressure in chamber 54. Therefore, the pressure in chamber 58 is the velocity pressure.

A source of main pressure is connected through restriction 65 and line 66 to chamber 58. Output line 67 is connected to line 66 for connecting the pressure in line 66 to square root extractor 68 having an output line 69 for providing a pressure dependent upon velocity. Chamber 55 is connected to atmosphere through port 70.

In operation, if the total pressure in chamber 53 increases indicating an increase in velocity pressure, the force pushing down on diaphragm 52 increases to push down on diaphragms 55 and 57 through pushers 59 and 60. The gap between diaphragm 57 and nozzle 61 decreases allowing less air to be ported to atmosphere increasing the pressure within chamber 58 thus resulting in an increase in the velocity pressure signal. Similarly, if the total pressure signal decreases, the velocity pressure signal will decrease. If the static pressure signal supplied to chamber 54 increases reducing the difference between total pressure and static pressure and thus reducing velocity pressure, the force acting upwards on diaphragm 52 increases to allow that diaphragm 52 to move slightly upwards with diaphragms 55 and 57 following through action of pushers 59 and 60 to increase the gap between diaphragm 57 and nozzle 61 for allowing a decrease of the pressure within chamber 58 and, therefore, a decrease of the velocity pressure signal. Similarly, a decrease of the static pressure within chamber 54 increases the velocity pressure signal within chamber 58.

Square root extractor 68 may comprise any of the square root extractors shown in application Ser. No. 950,335 filed Oct. 11, 1978, now U.S. Pat. No. 4,201,336.

The embodiments of the invention in which an exclusive property or right is claimed are defined as follows:

1. A sensor for sensing the static pressure within a duct regardless of the direction of the air moving through the duct comprising:
    a substantially rigid static pressure tube for sensing static pressure, said static pressure tube having a hollow inside and an aperture therein for connecting the static pressure outside said static pressure tube to its hollow inside, said static pressure tube further having first and second ends;
    output means connected with said static pressure tube intermediate said ends for providing an output pressure dependent upon said static pressure sensed by said static pressure tube, said output means being connected to the hollow inside for receiving said static pressure and having a flexible mounting means for allowing said static pressure tube to align with the air moving through the duct; and, alignment means associated with said static pressure tube to align said static pressure tube with respect to the air moving through said duct so that said sensor is direction insensitive to said air.

2. The sensor of claim 1 wherein said alignment means comprises means for self-aligning said static pressure tube.

3. The system of claim 2 wherein said self-aligning means comprises a tail attached to an end of said static pressure tube and having fins for automatically aligning said static pressure tube with respect to the air moving through the duct.

4. The sensor of claim 3 wherein said output means further comprises an output tube substantially perpendicular to said static pressure tube, and said flexible mounting means is connected between said hollow inside of said static pressure tube at one end and said output tube at its other end so that said output tube supplies an output pressure dependent upon said static pressure within said duct, said output tube and said flexible mounting means forming a support for said static pressure tube.

5. The sensor of claim 4 wherein said flexible mounting means comprises a flexible plastic tube.

6. The sensor of claim 5 wherein said sensor further comprises a total pressure sensor substantially insensitive to the direction of air moving through said duct for supplying an output pressure dependent upon the total pressure of said air.

7. The sensor of claim 6 wherein said total pressure sensor comprises a hollow manifold having a plurality of elongated tubes extending therefrom for connecting the total pressure of the air moving through the duct to the inside of said manifold, said manifold having an output means for supplying said output pressure dependent upon the total pressure of said air as based upon the average of the total pressure sensed by said elongated tubes.

8. The sensor of claim 1 wherein said output means further comprises an output tube substantially perpendicular to said static pressure tube, and said flexible mounting means is connected between said hollow inside of said static pressure tube at one end and said output tube at its other end so that said output tube supplies an output pressure dependent upon said static pressure within said duct, said output tube and said flexible mounting means forming a support for said static pressure tube.

9. The sensor of claim 8 wherein said flexible mounting means comprises a flexible plastic tube.

10. The sensor of claim 9 wherein said sensor further comprises a total pressure sensor substantially insensitive to the direction of air moving through said duct for supplying an output pressure dependent upon the total pressure of said air.

11. The sensor of claim 1 wherein said flexible mounting means comprises a flexible plastic tube for permitting rotation of said static pressure tube.

12. The sensor of claim 11 wherein said sensor further comprises a total pressure sensor substantially insensitive to the direction of air moving through the duct for supplying an output pressure dependent upon the total pressure of said air.

13. A flow station for sensing the velocity of air moving through a duct which sensor is substantially insensitive to the direction of air moving through said duct comprising:

a substantially rigid static pressure tube for sensing static pressure, said static pressure tube having a hollow inside and having an aperture therein for connecting the static pressure outside said static pressure tube to its hollow inside, said static pressure tube further having first and second ends;

output means connected with said static pressure tube intermediate said ends for providing an output pressure dependent upon said static pressure sensed by said static pressure tube, said output means being connected to the hollow inside of said static pressure tube for receiving said static pressure and having a flexible mounting means for allowing said static pressure tube to align with the air moving through the duct;

alignment means associated with said static pressure tube to align said static pressure tube with respect to the air moving through said duct so that said static pressure tube is direction insensitive to said air; and, a total pressure sensor substantially insensitive to the direction of air moving through said duct for supplying an output pressure dependent upon the total pressure of said air.

14. The flow station of claim 13 wherein said alignment means comprises means for self aligning said static pressure tube.

15. The flow station of claim 14 wherein said self-aligning means comprises a tail attached to an end of said static pressure tube and having fins for automatically aligning said static pressure tube with respect to the air moving through the duct.

16. The flow station of claim 15 wherein said total pressure sensor comprises a hollow manifold having a plurality of elongated tubes extending therefrom for connecting the total pressure of the air moving through the duct to the inside of said manifold, said manifold having an output means for supplying said output pressure dependent upon the total pressure of said air as based upon the average of the total pressure sensed by said elongated tubes.

17. The flow station of claim 16 further comprising subtractor means connected to said output means and to said manifold for subtracting said output pressure dependent upon said static pressure from said output pressure dependent upon said total pressure to yield velocity pressure and a square root extractor connected to said subtractor for taking the square root of said velocity pressure to produce a signal dependent upon velocity.

* * * * *